(12) United States Patent
Kim

(10) Patent No.: US 11,078,016 B2
(45) Date of Patent: Aug. 3, 2021

(54) MOBILE SORTING SYSTEMS

(71) Applicant: HanBin Kim, Milpitas, CA (US)

(72) Inventor: HanBin Kim, Milpitas, CA (US)

(*) Notice: Subject to any disclaimer, the term of this patent is extended or adjusted under 35 U.S.C. 154(b) by 31 days.

(21) Appl. No.: 16/554,168

(22) Filed: Aug. 28, 2019

(65) Prior Publication Data
US 2020/0071073 A1    Mar. 5, 2020

Related U.S. Application Data

(60) Provisional application No. 62/726,431, filed on Sep. 4, 2018.

(51) Int. Cl.
| | | |
|---|---|---|
| *B65G 1/04* | (2006.01) | |
| *B07C 5/36* | (2006.01) | |
| *B65G 1/133* | (2006.01) | |
| *B66D 3/26* | (2006.01) | |
| *B07C 5/34* | (2006.01) | |

(52) U.S. Cl.
CPC ............ *B65G 1/045* (2013.01); *B07C 5/3412* (2013.01); *B07C 5/368* (2013.01); *B65G 1/133* (2013.01); *B66D 3/26* (2013.01)

(58) Field of Classification Search
CPC .. B66C 9/00; B66C 9/02; B66C 11/00; B66C 11/04; B66C 11/06; B66C 11/12; B66C 11/14; B66C 17/04; B66C 17/20; C66C 7/02; C66C 7/04; B66D 3/26; B65G 1/133; B65G 1/045; B07C 5/3412; B07C 5/368; B07C 5/00; B25J 15/0014; B25J 15/0019; B25J 15/0028; B25J 15/009; B25J 15/0491; B25J 15/022; B25J 15/0273; B25J 9/023
See application file for complete search history.

(56) References Cited

U.S. PATENT DOCUMENTS

| | | | | |
|---|---|---|---|---|
| 3,572,513 A | * | 3/1971 | Tantlinger | ............. B60P 1/5442 |
| | | | | 212/180 |
| 3,756,544 A | * | 9/1973 | Bader | ...................... B64D 9/00 |
| | | | | 244/137.1 |
| 4,005,782 A | * | 2/1977 | Crockett | .............. B21D 43/105 |
| | | | | 414/591 |
| 4,492,504 A | * | 1/1985 | Hainsworth | .............. B66F 9/07 |
| | | | | 414/273 |
| 4,678,390 A | * | 7/1987 | Bonneton | ............ B65G 1/1375 |
| | | | | 294/4 |
| 4,732,554 A | * | 3/1988 | Hellmann | .............. B25J 9/0012 |
| | | | | 156/538 |

(Continued)

*Primary Examiner* — Glenn F Myers

(57) ABSTRACT

Embodiments conveyed herein seek to disclose a mobile sorting system. The system can include a mobile platform having one or more storage housings. The mobile sorting system can include a mobile platform having a storage area(s) and first and second motorized actuating assemblies. The second motorized actuating assembly can be positioned proximate to the first motorized actuating assembly. The storage areas includes a storage housing(s). The first and second motorized actuating assemblies each include end effectors that can prehend storage housings and containers, respectively. The first and second motorized actuating assemblies each include prehension elements. Each motorized actuating assembly has a firsts mode to prehend object using the end effectors, a second mode to translate the object, and a third mode to release the object.

10 Claims, 8 Drawing Sheets

(56) References Cited

U.S. PATENT DOCUMENTS

| | | | | |
|---|---|---|---|---|
| 5,622,470 | A | * | 4/1997 | Schaefer ................ B25J 9/1612 |
| | | | | 414/275 |
| 5,743,374 | A | * | 4/1998 | Monsees ................ B65G 57/08 |
| | | | | 198/403 |
| 6,102,647 | A | * | 8/2000 | Yap ........................ B65G 1/127 |
| | | | | 414/467 |
| 7,938,612 | B2 | * | 5/2011 | Springston .............. B60L 53/80 |
| | | | | 414/501 |
| 9,573,281 | B2 | * | 2/2017 | Takahashi ................ B25J 18/02 |
| 10,300,610 | B1 | * | 5/2019 | La Rovere ........... B25J 15/0293 |
| 10,343,881 | B2 | * | 7/2019 | Guo ...................... B65G 1/137 |
| 10,549,420 | B2 | * | 2/2020 | Bonora ................... B25J 13/06 |
| 2017/0334075 | A1 | * | 11/2017 | Eidelberg ................ B25J 9/023 |
| 2018/0201445 | A1 | * | 7/2018 | Battles ................. B65G 1/0492 |
| 2020/0074404 | A1 | * | 3/2020 | Gil, Jr. ................. G05D 1/0011 |

* cited by examiner

MOBILE SORTING SYSTEMS

CROSS-REFERENCE TO RELATED APPLICATIONS

This application claims priority to U.S. Provisional Application No. 62/726,431 filed Sep. 4, 2018, which is hereby incorporated herein by reference.

FIELD OF THE INVENTION

The present invention relates generally to sorting systems and specifically to mobile sorting systems.

BACKGROUND OF THE INVENTION

Courier services typically deliver messages, packages, and/or letters from one place or person to another place or person. Couriers may be distinguished from ordinary mail services by their unique features, such as speed, security, tracking, signature, specialization and individualization of express services, as well as swift delivery times, which are optional for most everyday mail services.

DETAIL DESCRIPTIONS OF THE INVENTION

Figure 1:
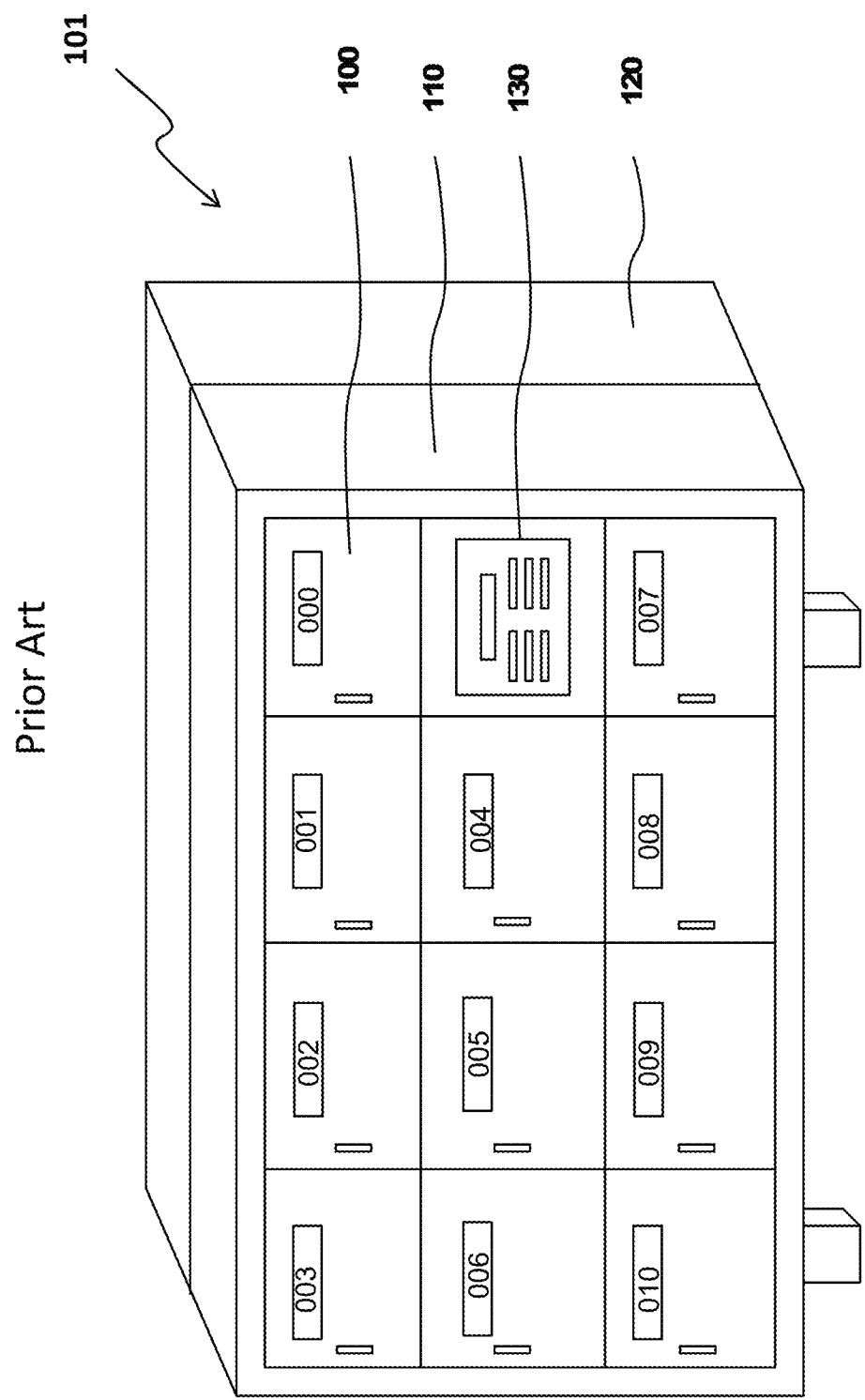
FIG. 1 depicts a perspective view of a curbside storage facility of the prior art.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

As a preface to the detailed description, it should be noted that, as used in this specification and the appended claims, the singular forms "a", "an" and "the" include plural referents, unless the context clearly dictates otherwise.

All illustrations of the drawings are for the purpose of describing selected versions of the present invention and are not intended to limit the scope of the present invention.

Embodiments conveyed herein seek to disclose mobile sorting systems. In some embodiments, the mobile sorting system can include at least one mobile platform each having at least one storage area, where each storage area a storage housing(s). At least one first motorized actuating assembly can be affixed proximate to one or more first surfaces of the mobile platform and coupled to at least one first end effector. Each first end effector can include a first prehension element(s). Each first motorized actuating assembly can be configured to prehend at least one of the storage housings via the first prehension element(s) and, within the mobile platform, translate the storage housing from a first housing location(s) to a second housing location(s).

The mobile sorting system may also include at least one second motorized actuating assemblies that can be affixed proximate to a second surface(s) of the mobile platform and coupled to one or more second end effectors. Each second end effector can include at least one second prehension element. The second motorized actuating assembly can be configured to prehend one or more containers via the second prehension element(s) and translate the container(s) from a first container position(s) to a second container position(s) and thereby deposit the container(s) in one or more compartments of at least one storage housing. Each second motorized actuating assembly can be positioned proximate to one of the first motorized actuating assembly. First container position(s) may each be located proximate to at least one container storage facility external to the mobile platform. Second container position(s) can be located proximate to at least one of the second housing locations.

Courier services typically transport courier items (e.g., messages, packages, and/or letters) from one location to another location. Couriers may be distinguished from ordinary mail services by their unique features, such as speed, security, tracking, signature, specialization and individualization of express services, as well as swift delivery times, which are optional for most everyday mail services.

Unmanned storage facilities can provide beneficial services to locations where people concentrate or visit periodically (e.g., apartment buildings, dormitories, office buildings, business centers, parking lots, as well as other locations where people concentrate or visit periodically). For example, locating unmanned storage facilities proximate to curbsides may allow delivery vehicles direct access thereto.

Referring now to the figures. FIG. 1 depicts a perspective view of a curbside unmanned storage facility, generally 101, of the prior art. Curbside unmanned storage facility 101 includes a pedestrian-facing portion 110 and courier-facing portion 120. Pedestrian-facing portion includes a plurality of compartment units 100 configured to temporarily store one or more courier items. To access courier items, users provide authentication information via user interface 130. Couriers access courier-facing portion 120 to deposit courier items in and retrieve courier items from compartment units 100.

Figure 2:
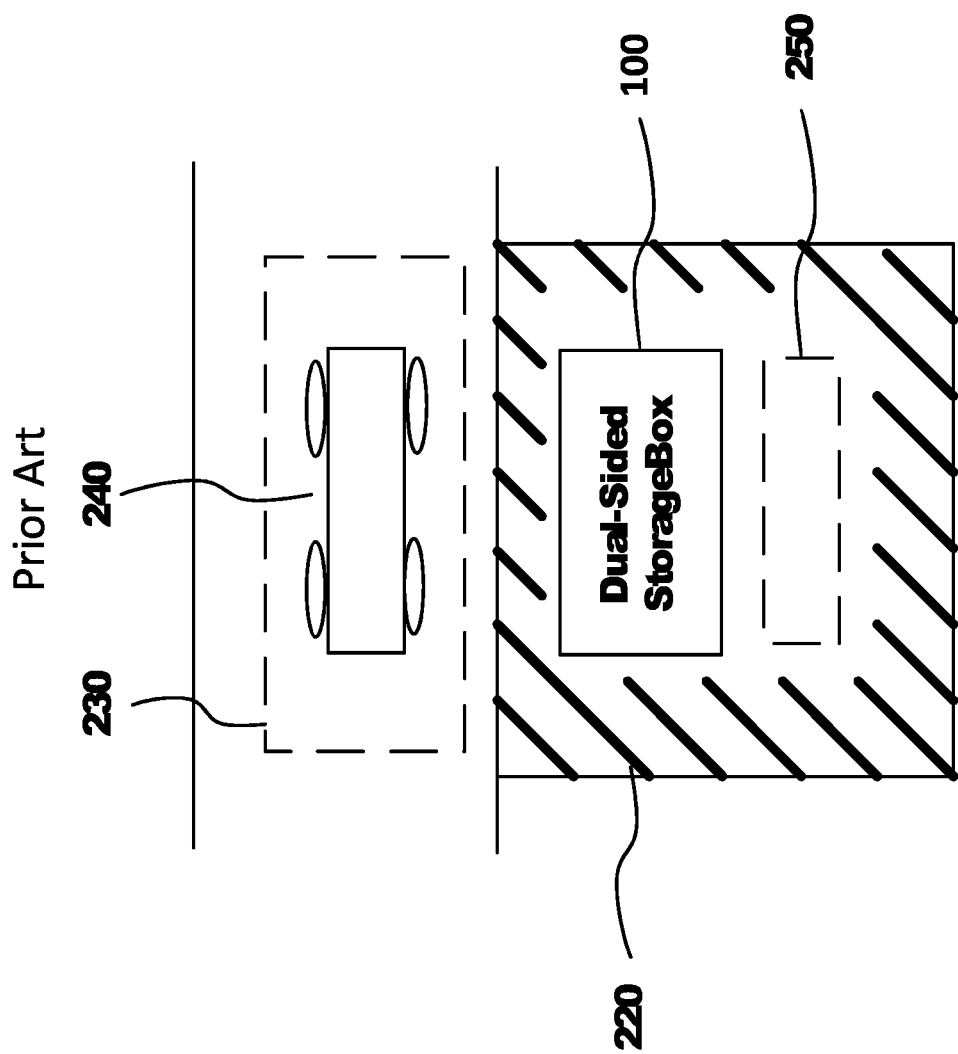
FIG. 2 depicts a top view of a configuration of the curbside storage facility of the prior art.

FIG. 2 depicts a top view of a configuration of the curbside unmanned storage facility of FIG. 1 according to the prior art. Here, curbside unmanned storage facility 101 is positioned curbside on walkway 220. Couriers access curbside unmanned storage facility 101 in load/unload area 230 positioned proximate to walkway 220 and transfer one or more courier items between courier vehicle 240 and curbside unmanned storage facility 101 (e.g., load and/or unload courier items). In the same vein, customers can access unmanned storage facility 101 in item collection area 250 to load and/or unload parcels. This process typically requires couriers to manually load and unload courier items.

Figure 3:
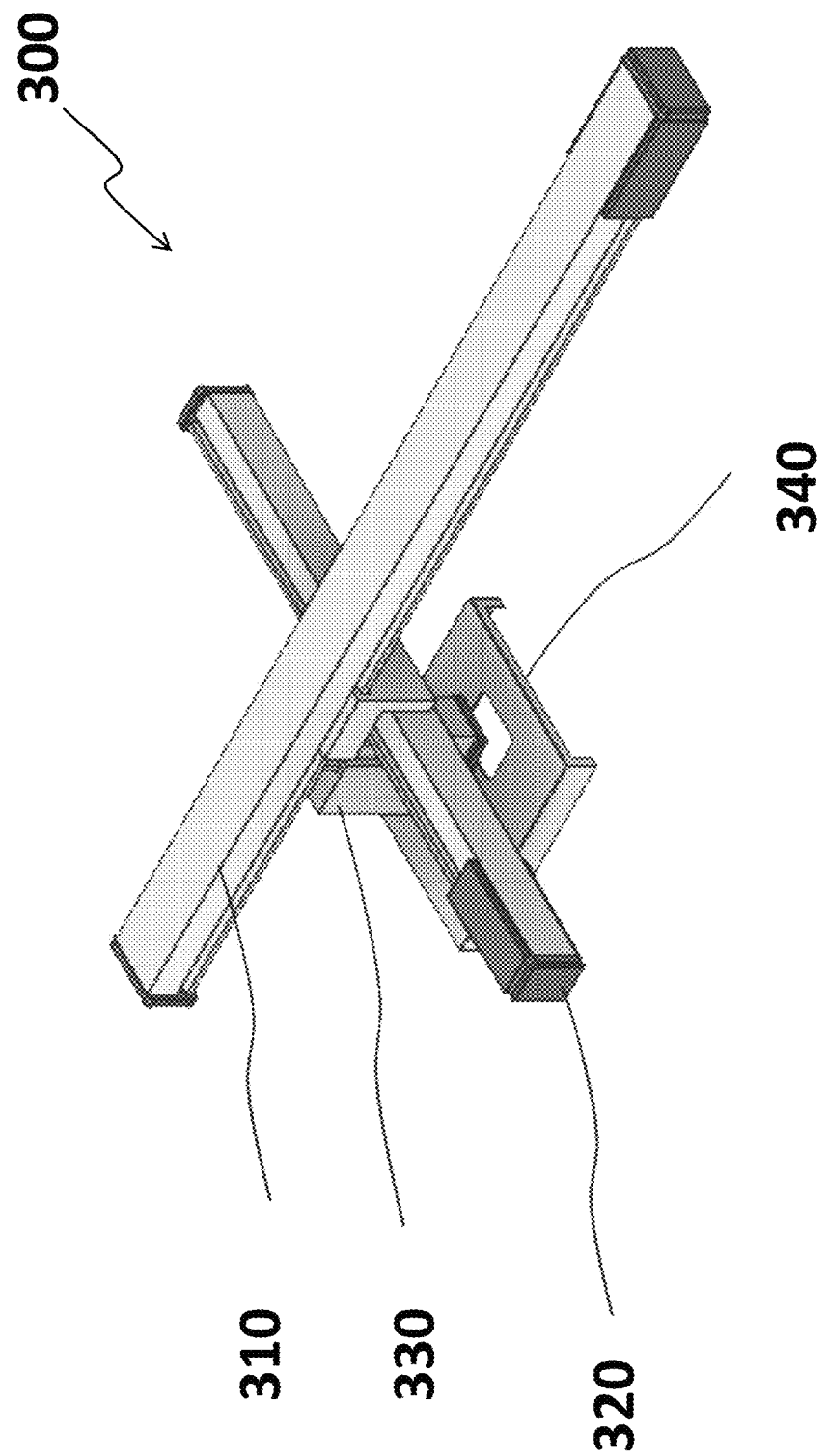
FIG. 3 depicts a perspective view of a sorting assembly according to some embodiments.

Embodiments conveyed herein seek to provide an autonomous mobile sorting system that can transfer between courier item storage facilities (e.g., storage facility 101, mailboxes, or similar manned or autonomous courier storage facilities) and courier vehicles. According to some aspects, the mobile sorting system can be a multi-component system that may include mobile platform 810, sorting assembly 300, and transportation assembly 500. FIG. 3 depicts a perspective view of a sorting assembly according to some aspects. In certain embodiments, sorting assembly 300 can be a motorized actuating assembly positioned proximate to one or more internal surfaces of mobile platform 810. For example, sorting assembly 300 can include several electric linear actuators (e.g., linear actuators 310, 320 and 330).

Not to be limited by theory, the electric linear actuators can include electric motors mechanically connected to turn lead screws and threaded leads or ball nuts having corresponding threads that match those of the screw can be prevented from rotating with the screw. For example, when the screw rotates, the nut can be driven along the threads, where the direction the nut traverses depends on which direction the screw rotates and returns the actuator to its original position. In certain aspects, the screw can be coupled to a traveling plate. As an exemplary, the electric linear actuators can include encoders that can control velocity, position, torque, and/or applied force. In certain aspects, applicable electric linear actuators can include, but are not limited to, screw actuators, linear belt-driven actuators, precision linear stage actuators, linear slide actuators, other linear actuators, or a combination of two or more thereof.

In other embodiments, sorting assembly 300 can include linear actuators 310, 320, and 330. For example, linear actuators 310 and 320 can each include a traveling plate, where the traveling plates may be coupled to each other to perpendicularly orient the longitudinal sides of linear actuators 310 and 320 to each other in the vertical plane. In some aspects, a first end of linear actuator 330 can be coupled to the traveling plate of linear actuator 320. In other aspects end effector 340 can be coupled to the traveling plate of linear actuator 320. For example, end effector 340 can include at least one prehension element, where sorting assembly 300 can prehend storage housing 400 (discussed below) via the prehension element and translate storage housing 400 from one location within mobile platform 810 to another therein (e.g., from an initial housing location to a secondary housing location). In certain embodiments, sorting assembly 300 can operate in a first mode to prehend storage housing 400, in a second mode to translate storage housing from one location within mobile platform 810 to another therein, and in a third mode to release storage housing 400.

Figure 4:
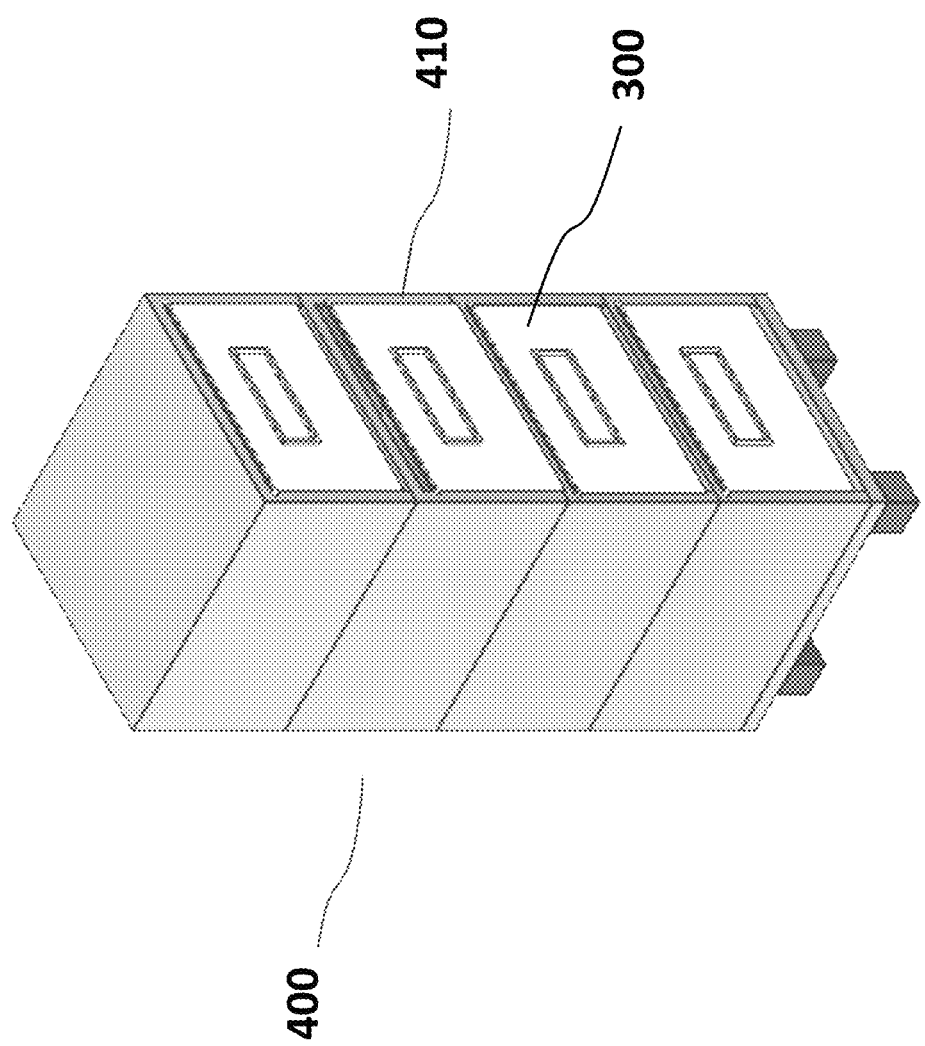
FIG. 4 depicts a perspective view of a storage housing according to other embodiments.

As an exemplary, the prehension element of end effector 340 can include one or more impactive elements (e.g., a structure(s) that may physically grasp objects by direct impact upon the object, such as jaws-like or clamp-like structures) that may be utilized to physically grasp one or more storage housings 400. In certain embodiments, the prehension element of end effector 340 can include one or more astrictive elements (e.g., elements that can grasp objects utilizing attractive forces applied to surfaces of such objects, such as elements that utilize one or more of vacuum, magneto-, and electroadhesion forces) that may be utilized to dismountable prehend one or more storage housings 400. FIG. 4 depicts a perspective view of a storage housing, generally 400, according to other embodiments. In other aspects, storage housing 400 can be an enclosure having one or more compartment units 410 each capable of accepting at least one storage container 300.

Figure 5:
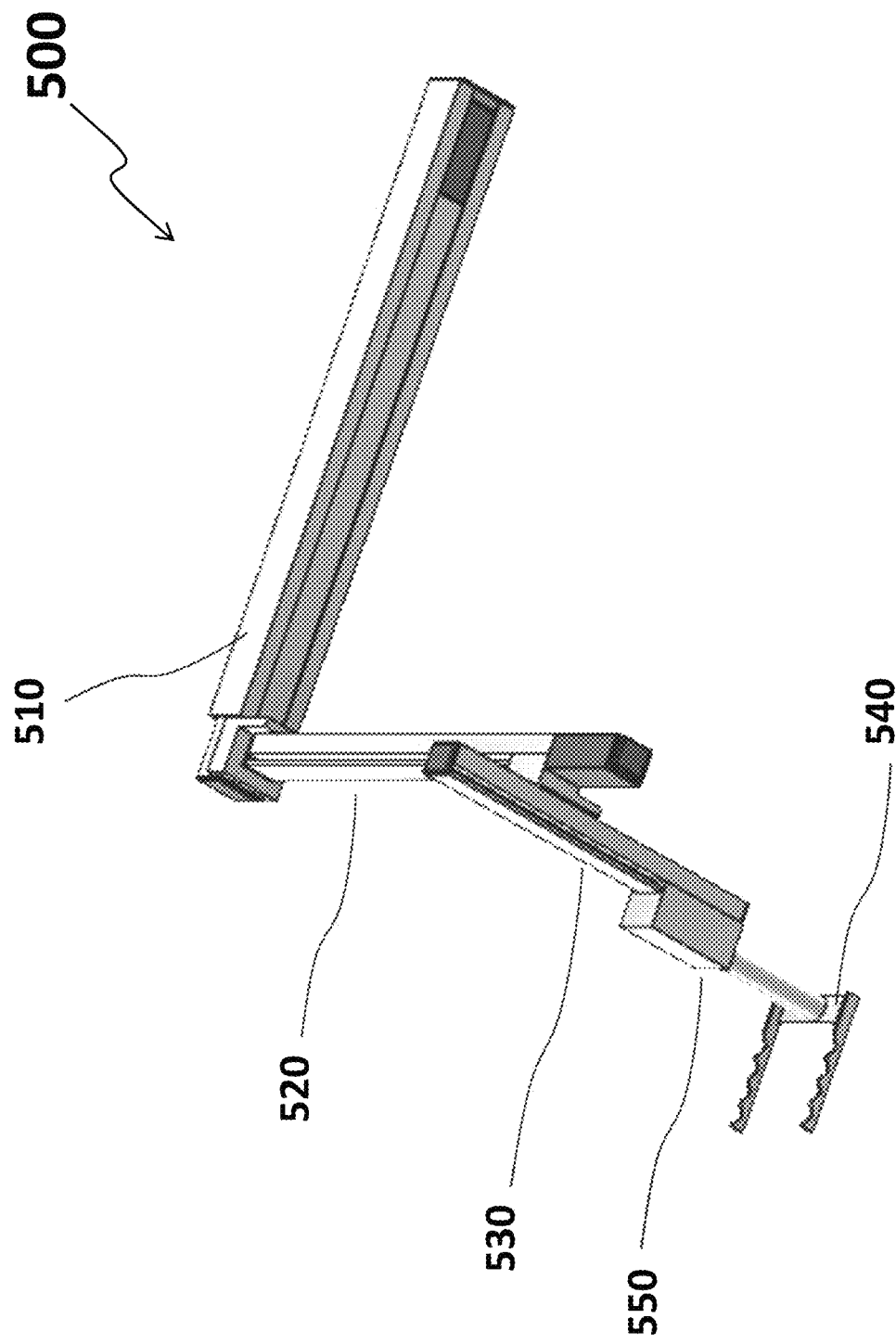
FIG. 5 depicts a perspective view of a transportation assembly according to certain embodiments.

FIG. 5 depicts a perspective view of a transportation assembly, generally 500, according to certain embodiments. In yet other embodiments, transportation assembly 500 can be a motorized actuating assembly positioned ventral as well as proximate to sorting assembly 300. For example, transportation assembly 500 can be positioned proximate to the distal end of mobile platform 810 (e.g., proximate to the loading area of mobile platform 810). For example, transportation assembly 500 can include several interconnected electric linear actuators (e.g., linear actuators 510, 520 and 530), rotational motor 550 coupled to one or more of the electric linear actuators, and end effector 540 coupled rotational motor 540. Linear actuators 510, 520, and 530 can function to one or more of linear actuators 310, 320, and 330 (discussed above) according to still other embodiments.

As an exemplary, linear actuator 510 can include a traveling plate coupled to the proximate end of linear actuator 520 thereby orienting the longitudinal sides of linear actuator 510 perpendicular to those of linear actuator 520 in the horizontal plane. Here, the traveling plate of linear actuator 520 can be oriented coplanar with linear actuator 510 in the horizontal plane. Linear actuators 520 and 530 can be coupled to each other via their traveling plates to perpendicularly orient the longitudinal sides of linear actuators 520 and 530 to each other in the vertical plane (e.g., linear actuators 520 and 530 can be oriented horizontally and vertically, respectively). In some aspects, end effector 540 can be rotationally coupled to the ventral end of linear actuator 530 via rotational motor 550. Rotational motor 550 can be an electric motor capable of rotational movement under electronic control.

Transportation assembly 500 can be capable of operating in a first mode to prehend storage container 700, a second mode to translate storage container 700 from a first location (e.g., proximate to a courier storage facility or storage housing 400) to a second location (e.g., proximate to storage housing 400 or courier storage facility), and a third mode to release storage container 700 (e.g., and thereby deposit storage container 700 within compartment unit 410 or a courier storage facility).

Figure 6:
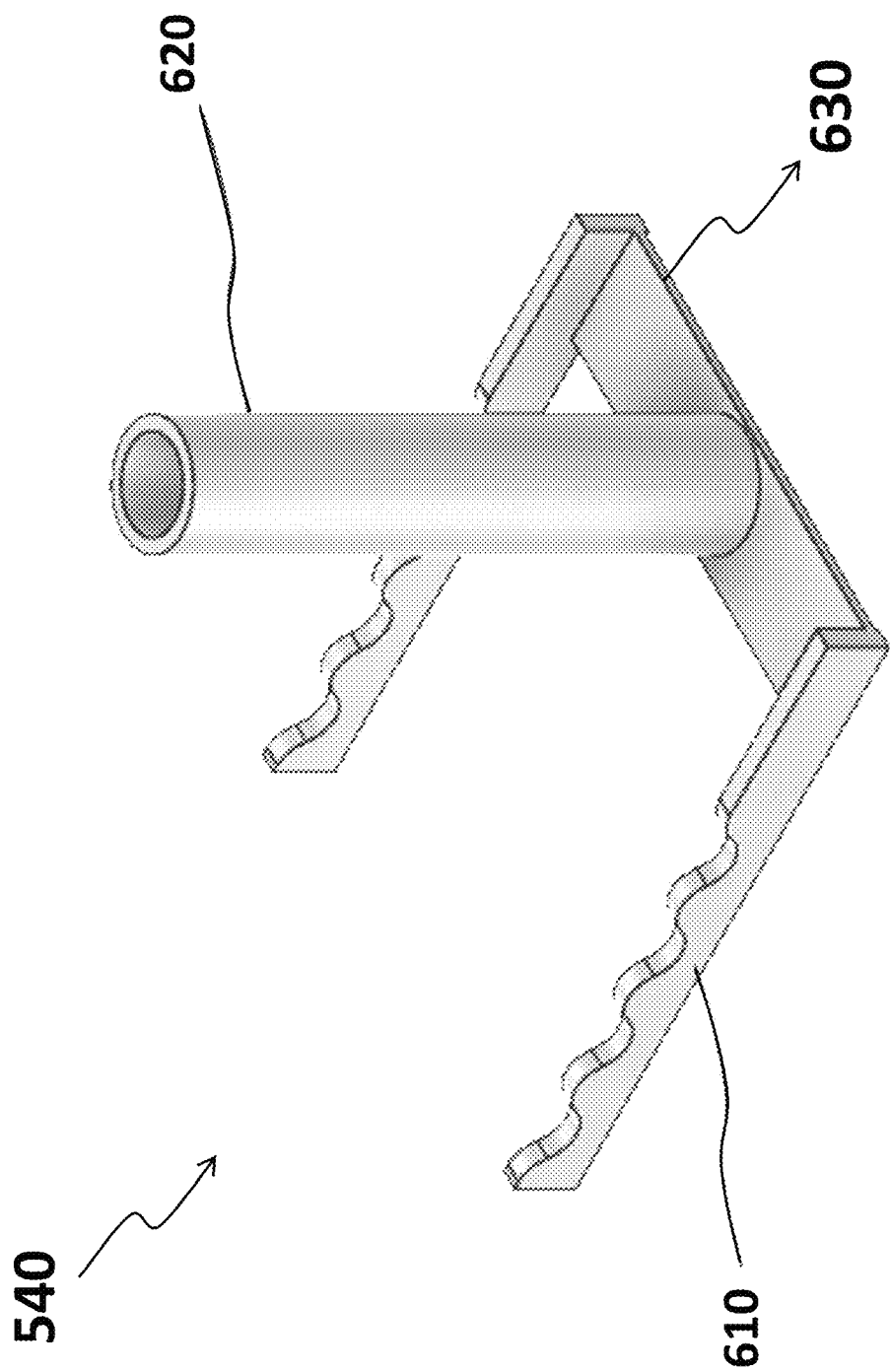
FIG. 6 depicts a perspective view of a container prehension unit according to yet still other embodiments.

FIG. 6 depicts a perspective view of a container prehension unit according to yet still other embodiments. For example, end effector 540 can include shaft 620, plate 630, and prehension elements 610. In certain embodiments, shaft 620 can be coupled to plate 630 and positioned equidistant from each end of plate 630. For example, each prehension element 600 can have a longitudinal wall coupled to an end of plate 630 and oriented perpendicular to shaft 610. In other embodiments, end effector 600 can be rotatably coupled to rotational motor 540 via shaft 620. Rotational motor 550 can be capable of axially rotating end effector 540 about linear actuator 530 according to still other embodiments according to yet still other embodiments.

Figure 7:
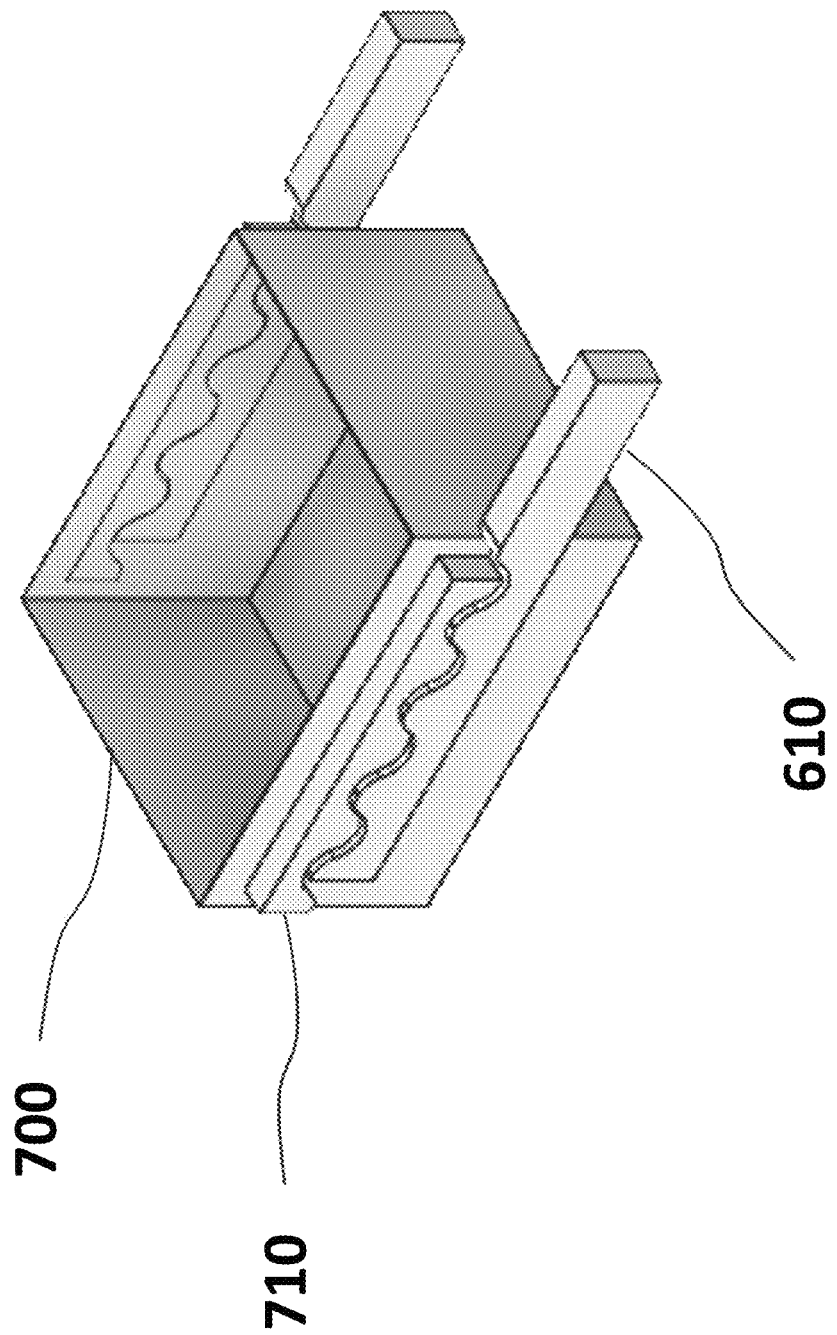
FIG. 7 depicts a perspective view of a storage container according to some embodiments.

As an exemplary, prehension elements 610 can each include impactive structures complementary to structures extending from one or more external wall of storage container 700. In some aspects, each prehension element 610 can include one or more complementary interengaging structures extending from its dorsal surface. In some aspects, the complementary structures can include one or more of periodic peaks and valleys, gear-shaped structures, longitudinal protrusions, similar interengageable structures, or a combination of two or more thereof. FIG. 7 depicts a perspective view of a storage container, generally 700, according to other embodiments. As an exemplary, storage container 700 can be a rigid and hollow box enclosure having a pair of complementary ribs 710 longitudinally extending from opposing side walls. In some aspects, each complementary rib 710 can include one or more complementary interengaging structures (discussed above) extending from its ventral surface that complement the complementary interengaging structures of prehension element 610.

Figure 8:
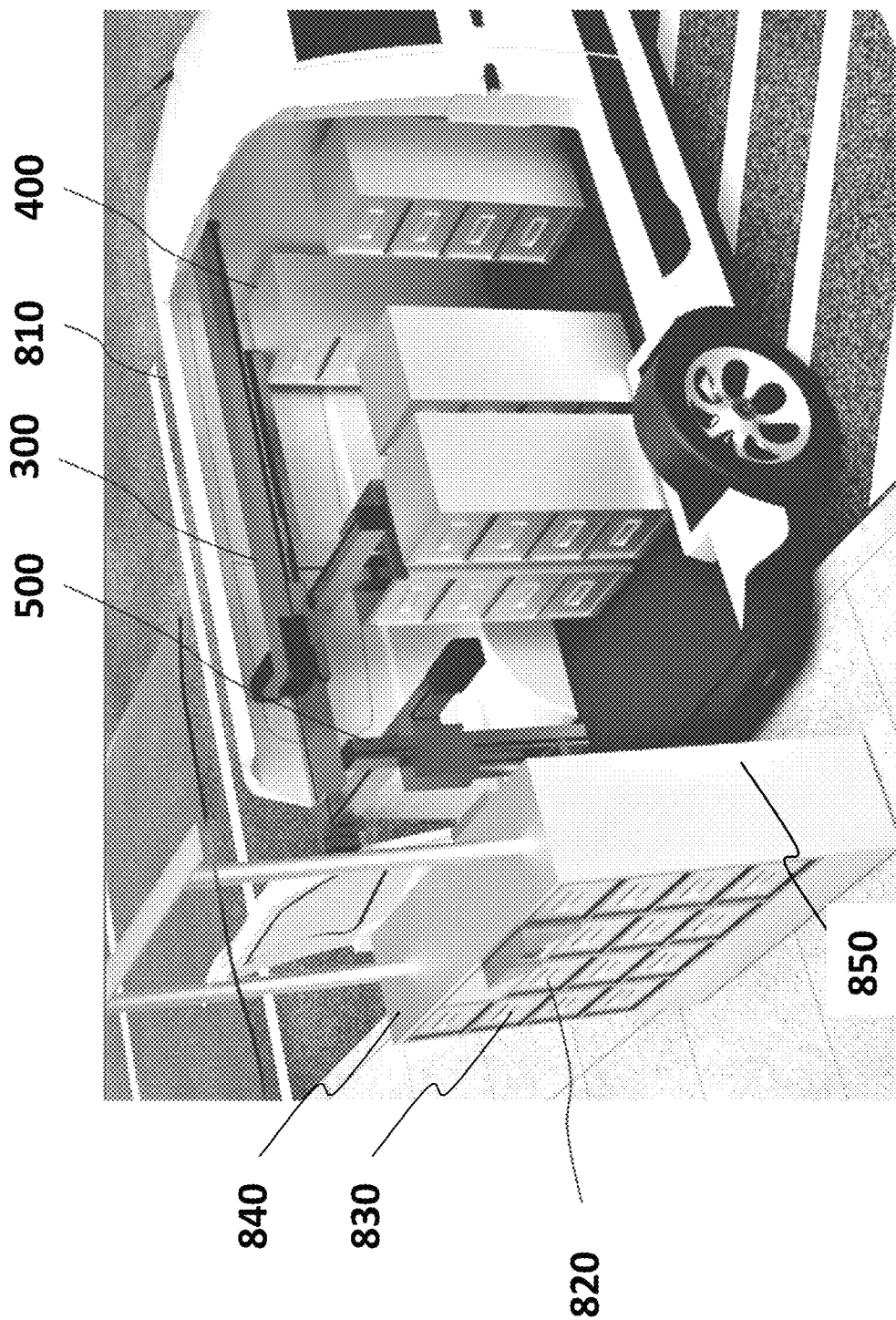
FIG. 8 depicts a side perspective view of a mobile sorting system according to certain embodiments.

FIG. 8 depicts a side perspective view of the mobile sorting system according to certain embodiments. The mobile sorting system can include at least one sorting assembly 300 affixed proximate to one or more transportation assembly 500. In some aspects, operation of the mobile sorting systems disclosed herein may initiate when the loading area of courier vehicle 810 (e.g., proximate to the posterior end of courier vehicle 810) is positioned proximate to courier storage facility 820, for example, positioned proximate to the courier-facing portion of a unmanned storage facility having both a pedestrian-facing portion and a courier-facing portion.

In certain aspect, courier vehicle 810 can be a mobile platform that may include the vehicular propulsion of a terrestrial platform (e.g., vehicular propulsion provided by wheels, continuous tracks, maglev, etc.) or an aerial platform (e.g., vehicular propulsion provided by propulsive nozzles, propellers, thrust generators). In some aspects, courier vehicle 810 can be an autonomous platform (i.e. a mobile platform that can operate without a person on board and can sense their environment and navigate without human intervention). According to other aspects, courier storage facility can include a user/pedestrian-facing portion 840, a courier-facing portion 850, and at least one compartment units 830. For example, compartment units 830 can be accessible from the user/pedestrian-facing portion 840 as well as the courier-facing portion 850. As an exemplary, users may provide authentication information to access courier items in compartment units 830 from the user/pedestrian-facing portion 840. Couriers may access compartment units from the courier-facing portion 850 to, for example, deposit courier items in and/or retrieve courier items from compartment units 830.

Operating in its load state, transportation assembly 500 initiates the first load mode and prehends storage container 700 via interengaging the complementary interengaging structures of end effector 540 with the complementary interengaging structures of storage container 700, initiates the second load mode to translate storage container 700 from a first location proximate to the courier-facing portion of the courier storage facility to a second location positioned proximate to storage housing 400, and initiates the third load mode to release storage container 700 by disengaging the complementary interengaging structures of end effector 540 and storage container 700 and thereby deposits storage container 700 compartment unit 410.

Operating in its unload state, transportation assembly 500 initiates the first unload mode to prehend storage housing 400 via end effector 340, initiates the second unload mode to translate storage housing 400 from a first location distal to the load area (e.g., the posterior end of courier vehicle 810) to a second location proximate to the courier-facing portion 850, and initiates the third unload mode to release storage housing 400 by disengaging end effector 340 from the dorsal end of storage housing 400. Sorting assembly 300 initiates the first unload mode to prehends storage container 700 (as described above), initiates the second unload mode to translate storage container 700 from a first location proximate to storage housing 400 to a second location positioned proximate to courier-facing portion 850 and thereby deposit storage container 700 within courier storage facility 820.

Embodiments conveyed herein seek to disclose a mobile sorting system. In some embodiments, the mobile sorting system can include at least one mobile platform each having at least one storage area, where each storage area a storage housing(s). At least one first motorized actuating assembly can be affixed proximate to one or more first surfaces of the mobile platform and coupled to at least one first end effector. Each first end effector can include a first prehension element(s). Each first motorized actuating assembly can be configured to prehend at least one of the storage housings via the first prehension element(s) and, within the mobile platform, translate the storage housing from a first housing location(s) to a second housing location(s).

The mobile sorting system may also include at least one second motorized actuating assemblies that can be affixed proximate to a second surface(s) of the mobile platform and coupled to one or more second end effectors. Each second end effector can include at least one second prehension element. The second motorized actuating assembly can be configured to prehend one or more containers via the second prehension element(s) and translate the container(s) from a first container position(s) to a second container position(s) and thereby deposit the container(s) in one or more compartments of at least one storage housing. Each second motorized actuating assembly can be positioned proximate to one of the first motorized actuating assembly. First container position(s) may each be located proximate to at least one container storage facility external to the mobile platform. Second container position(s) can be located proximate to at least one of the second housing locations.

First prehension elements can each include one or more impactive elements affixed proximate to a surface(s) of each first end effector. In prehending storage housings via one or more first prehension elements, the first motorized actuating assembly may be configured to prehend the storage housing(s) via the impactive element(s). Each first prehension element can include one or more astrictive elements each affixed proximate to at least one surface of the first end effector(s). In prehending the storage housing via one or more first prehension elements, the first motorized actuating assembly may be configured to prehend the storage housing(s) via the astrictive element(s).

Second prehension elements can each include a contigutive element(s) affixed proximate to at least one surface of the second end effector(s). In prehending the container via one or more second prehension element, the second motorized actuating assembly may be configured to prehend the container(s) via the contigutive element(s). Container can each include one or more external walls and at least one longitudinal protrusion extending from each of the external walls. Longitudinal protrusions can each include at least one ventral surfaces. Ventral surfaces can each include one or more first complementary structures. Second end effectors can each include at least one dorsal surface. Dorsal surfaces can each include at least one second complementary structures. In prehending the container via the second prehension element(s), second motorized actuating assemblies can be configured to interengage the first complementary structure(s) and the second complementary structure(s).

First complementary structures and second complementary structures can each include periodic peaks and valleys. In interengaging first complementary structures and second complementary structures, each second motorized actuating assembly may be configured to interengage the periodic peaks and valleys of first complementary structures and second complementary structures. First complementary structures and second complementary structures can each include gear-shaped structures. In interengaging first complementary structures and second complementary structures, second motorized actuating assemblies may each be configured to interengage the gear-shaped structures of first complementary structures and second complementary structures. Applicable mobile platforms can include, but are not limited to, terrestrial platforms and aerial platform. Applicable mobile platforms can include autonomous platforms.

Second end effectors can each include at least one substantially planar base plate that may include first end(s), second end(s), and at least one length at least equal to a width(s) of the container(s). Second end effectors can each include at least one first arm that may include at least one first lateral wall coupled to at least one of the first ends. Second end effectors can each include one or more second arms that may each include a second lateral wall(s) coupled to at least one of the second ends. First arms and second arms can each include at least one dorsal surface, which may include at least one of the second prehension elements.

First motorized actuating assemblies can each include one or more first line actuators, second linear actuators, and actuators. Here, first linear actuators can include at least one first traveling plate. Second linear actuators can each include at least one second traveling plate coupled to one of the first traveling plates and oriented perpendicular to one of the first linear actuators. Third linear actuators can each include a first end(s) and a second end(s), where each first end can be coupled to at least one of the second traveling plates and each second end can be coupled to at least one of the first end effectors.

Second motorized actuating assemblies can each include one or more first linear actuators, second linear actuators, third linear actuators, and rotational motors, where each rotational motor may be coupled to at least one second end effector and can be configured to axially rotate the second end effector(s) about one of the third linear actuators. First linear actuators can each include at least one first traveling plate. Each second linear actuators may be oriented perpendicular to at least one first linear actuator and may include at least one second traveling plate and one or more first ends. Each first end may be coupled to at least one first traveling plate. Each third linear actuator may be oriented perpendicular to at least one first linear actuator in the vertical plane. Each third linear actuator can include at least one third traveling plate and one or more second ends. Third traveling plates can each be coupled to at least one second traveling plate. Storage housings can each include at least one receptacle configured to receive at least one container.

Although the invention has been explained in relation to its preferred embodiment, it is to be understood that many other possible modifications and variations can be made without departing from the spirit and scope of the invention.

What is claimed is:
1. A mobile sorting system comprising:
   a mobile platform comprising a storage area, the storage area comprising a storage housing;
   a first motorized actuating assembly affixed proximate to a first surface of the mobile platform and coupled to a first end effector, the first end effector comprising a first prehension element, the first motorized actuating assembly configured to prehend the storage housing via the first prehension element and, within the mobile platform, translate the storage housing from a first housing location to a second housing location;
   a second motorized actuating assembly affixed proximate to a second surface of the mobile platform and coupled to a second end effector, the second end effector comprising a second prehension element, the second motorized actuating assembly configured to prehend a container via the second prehension element and translate the container from a first container position to a second container position and thereby deposit the container in a compartment of the storage housing; and
wherein
   the second motorized actuating assembly positioned proximate to the first motorized actuating assembly;
   the first container position located proximate to a container storage facility external to the mobile platform;
   the second container position located proximate to the second housing location;
   the container comprises an external wall and a longitudinal protrusion extending from the external wall, the longitudinal protrusion comprising a ventral surface, the ventral surface comprises a first complementary structure;
   the second end effector comprising a dorsal surface, the dorsal surface comprising a second complementary structure;
   in prehending the container via the second prehension element, the second motorized actuating assembly is configured to interengage the first complementary structure and the second complementary structure;
   the first complementary structure and the second complementary structure each comprise gear-shaped structures; and
   in interengaging the first complementary structure and the second complementary structure, the second motorized actuating assembly is configured to interengage the gear-shaped structures of the first complementary structure and the second complementary structure.

2. The mobile sorting system of claim 1, wherein
the first prehension element comprises an astrictive element affixed proximate to a surface of the first end effector; and
in prehending the storage housing via the first prehension element, the first motorized actuating assembly is configured to prehend the storage housing via the astrictive element.

3. The mobile sorting system of claim 1, wherein
the second prehension element comprises a contigutive element affixed proximate to a surface of the second end effector; and in prehending the container via the second prehension element, the second motorized actuating assembly is configured to prehend the container via the contigutive element.

4. The mobile sorting system of claim 1, wherein
the first complementary structure and the second complementary structure each comprise periodic peaks and valleys; and
in interengaging the first complementary structure and the second complementary structure, the second motorized actuating assembly is configured to interengage the periodic peaks and valleys of the first complementary structure and the second complementary structure.

5. The mobile sorting system of claim 1, wherein the mobile platform is a terrestrial platform.

6. The mobile sorting system of claim 1, wherein the mobile platform is an autonomous platform.

7. The mobile sorting system of claim 1, wherein the second end effector comprises:
   a substantially planar base plate comprising a first end, a second end, and a length at least equal to a width of the container;
   a first arm comprising a first lateral wall coupled to the first end;
   a second arm comprising a second lateral wall coupled to the second end; and
   the first arm and the second arm each comprise a dorsal surface comprising the second prehension element.

8. The mobile sorting system of claim 1, wherein the first motorized actuating assembly comprises:
   a first linear actuator comprising a first traveling plate;
   a second linear actuator comprising a second traveling plate coupled to the first traveling plate and oriented perpendicular to the first linear actuator; and
   a third linear actuator comprising a first end and a second end, the first end coupled to the second traveling plate and the second end coupled to the first end effector.

9. The mobile sorting system of claim 1, wherein the second motorized actuating assembly comprises:
   a first linear actuator comprising a first traveling plate;
   a second linear actuator oriented perpendicular to the first linear actuator in the horizontal plane and comprising a second traveling plate and a first end, the first end coupled to the first traveling plate;
   a third linear actuator oriented perpendicular to the second linear actuator in the vertical plane, the third linear actuator comprising a third traveling plate and a second end, the third traveling plate coupled to the second traveling plate;
   a rotational motor coupled to second end and the first end effector; and
   wherein the rotational motor is coupled to the second end effector and configured to axially rotate the second end effector about the third linear actuator.

10. The mobile sorting system of claim 1, wherein storage housing comprises a receptacle configured to receive the container.

* * * * *